United States Patent
Gregg et al.

(10) Patent No.: US 8,022,115 B2
(45) Date of Patent: Sep. 20, 2011

(54) ANTI-FOULING ULTRAHIGH MOLECULAR WEIGHT POLYETHYLENE COMPOSITIONS AND METHODS OF USING THE SAME

(75) Inventors: Joseph V. Gregg, Fort Wayne, IN (US); Brian Yarcich, Fort Wayne, IN (US)

(73) Assignee: Quadrant EPP AG, Lenzburg (CH)

( * ) Notice: Subject to any disclaimer, the term of this patent is extended or adjusted under 35 U.S.C. 154(b) by 0 days.

(21) Appl. No.: 12/564,253

(22) Filed: Sep. 22, 2009

(65) Prior Publication Data

US 2011/0070454 A1 Mar. 24, 2011

(51) Int. Cl.
C09D 5/16 (2006.01)
C08K 5/06 (2006.01)
C08K 3/10 (2006.01)
C08K 3/34 (2006.01)

(52) U.S. Cl. ........ 523/122; 523/177; 524/371; 524/403; 524/424

(58) Field of Classification Search .................. 523/122, 523/177; 524/371, 403, 424
See application file for complete search history.

(56) References Cited

U.S. PATENT DOCUMENTS

| | | | |
|---|---|---|---|
| 6,528,556 B1 | 3/2003 | Herbst et al. | |
| 6,790,923 B2 | 9/2004 | Smith et al. | |
| 6,904,858 B2 | 6/2005 | Pastore | |
| 7,456,242 B2 | 11/2008 | Smith et al. | |
| 2002/0010228 A1 | 1/2002 | Simendinger, III | |
| 2004/0082492 A1 | 4/2004 | Kohler et al. | |
| 2006/0099161 A1 | 5/2006 | Nakane et al. | |
| 2006/0188580 A1 | 8/2006 | Sacks | |
| 2007/0160766 A1 | 7/2007 | Copeland | |
| 2008/0032119 A1 | 2/2008 | Feldhahn et al. | |
| 2008/0086808 A1 | 4/2008 | Sutton et al. | |
| 2008/0166174 A1 | 7/2008 | Kennedy et al. | |
| 2009/0014474 A1 | 1/2009 | Kennedy et al. | |
| 2009/0185867 A1 * | 7/2009 | Masters et al. | 405/216 |

FOREIGN PATENT DOCUMENTS

| | | |
|---|---|---|
| WO | 02/068520 | 9/2002 |
| WO | 2008/033112 | 3/2008 |

OTHER PUBLICATIONS

European Search Report for Application No. EP09175856 dated Apr. 16, 2010.

* cited by examiner

*Primary Examiner* — Kriellion Sanders

(74) *Attorney, Agent, or Firm* — Brooks Kushman P.C.

(57) ABSTRACT

It has now been surprisingly and unexpectedly discovered that a combination of polychlorophenoxyphenol, a silver-containing biocide, and an organopolysiloxane, when added to UHMWPE, renders the UHMWPE resistant to both soft and hard fouling. The polychlorophenoxy phenol is preferably 2.4.4'-trichloro-2'-hydroxy-diphenylether and the metal-containing biocide is preferably a silver zeolite.

19 Claims, 3 Drawing Sheets

ANTI-FOULING ULTRAHIGH MOLECULAR WEIGHT POLYETHYLENE COMPOSITIONS AND METHODS OF USING THE SAME

BACKGROUND OF THE INVENTION

1. Field of the Invention

The subject invention is directed to anti-fouling polyethylene compositions and particularly anti-fouling ultrahigh molecular weight polyethylene "AF-UHMWPE" compositions which are resistant to fouling in aqueous, particularly marine environments, and to the use of such compositions.

2. Background Art

Items exposed to aqueous environments, particularly those of reservoirs, lakes or streams, and in particular salt water, tend to accumulate a large growth of biological organisms on their surface. This growth is particularly problematic in warmer climates. Ocean-going ships are but one example. In days gone by, clipper ships and wooden steamships were covered with copper plates below the waterline to minimize growth of molds, algae, barnacles, and the like. However, even with such copper plates, vessels still had to be periodically scraped below the waterline. In the salty environment, the copper plating life was only a few years at best.

Modern ships of steel have the same problems. Growth of organisms greatly increases the power requirements necessary to drive the ship through the water. Top speed is limited as well. Anti-fouling paints have replaced copper plates as the anti-fouling medium. These paints, in general, contain large amounts of copper and tin compounds. Some paints are designed to have a very slick surface such that organisms will be swept away at speed. However, such coatings are not feasible on large ships, whose maximum speed is relatively slow. Another common anti-fouling paint is one which "sloughs off" over time, continually exposing a fresh surface, and hence "fresh" anti-fouling agents. All these anti-fouling paints containing heavy metals, such as copper, are being reviewed for their potential harm to the environment.

Seachests are another example of an item exposed to marine environments. Seachests are large "coffin-like" bodies located at the bottom of a ship's hull, through which water may enter or leave the bilge. Seachests are described in U.S. Pat. No. 6,904,858 whose disclosure in this regard is incorporated herein by reference. Further non-limiting examples of items where aquatic growth should be minimized include floating docks, buoys, piers, water holding tanks, and the like.

It is known to incorporate biocides into polymers to minimize microbial growth. For example, Feldhahn et al. U.S. published application 2008/0032119 A1 discloses medical articles such as vaporizers whose surface is textured and hydrophobed by pressing hydrophobic particles into a polymer containing a biocide, and Kohler et al. U.S. published application 2004/0082492 A1 discusses incorporating biocides into polymer shapes used as packings in heat transfer apparatus used in heating and air conditioning (HVAC) equipment. Copeland U.S. published application 2007/0160766 A1 discloses coatings prepared by dissolving a hydrocarbon resin, a thermoplastic polymer, and a biocide into an organic solvent.

UHMWPE is a unique polymer with exceptional strength and lubricity characteristics. UHMWPE is distinguished from other polyethylene polymers such as high density high molecular weight polyethylene in that the ultra high molecular weight restricts processing by conventional thermoplastic polymer processing techniques such as extrusion, roto forming, and injection molding. UHMWPE resin is supplied as fine particles which must be consolidated by what is essentially a high pressure sintering at elevated temperature. Both batch processing processes as well as ram extrusion processes have been used. Net-shape processing may also be used, for example for the ski runners of snowmobiles.

In batch and net-shape processes, the UHMWPE powder is introduced into a very thick-walled mold and consolidated at high pressure and at elevated temperature. Temperatures of from 160° C. to 280° C. may be used, for instance. At higher temperatures, decomposition and oxidation processes may start to occur. The crystalline melt temperature of UHMWPE is about 130° C. to 135° C. See for instance, U.S. Pat. No. 5,453,234, which is incorporated herein by reference.

In the ram extrusion process, UHMWPE powder is introduced into a chamber and rammed at high pressure through a heated zone, and through a die of the proper geometry. This process has been used for many years to produce geometrically symmetrical moldings such as cylindrical extrusions such as rods and tubes in large cross-sectional sizes, and asymmetrical moldings of more limited size such as flats, channels, etc. Uneven shrinkage, distortion, and other problems have prevented the formation of sheet-type products of significant width until recently, as evidenced by U.S. published applications 2008/0020182, 2008/0018022, 2008/0018011, 2008/0018026 which are incorporated herein by reference. Processing aids such as stearic acid or stearate salts are sometimes added, and extrusion may take place after displacement of air by nitrogen to minimize oxidation. However, the choice of additives which can be employed with UHMWPE is more limited than with other polymers, because not only must these survive the high temperature and pressure of sintering, but must also not induce or catalyze oxidation reactions. In ram extrusion processes, the additives must also not increase the friction between the UHMWPE and the heated die.

UHMWPE, like other polymers, is also subject to fouling. In marine environments, a distinction may be made between soft fouling, e.g. growth of algae and like organisms, and hard fouling such as by barnacles, mollusks, bryozoans, etc. In many applications, resistance to both soft and hard fouling is desirably present. It would be desirous to provide for articles of UHMWPE which take advantage of the strength properties of the latter and are processable by standard UHMWPE processes, while being resistant to both hard and soft fouling as well as improving the ease in which fouling can be removed.

SUMMARY OF THE INVENTION

It has now been surprisingly and unexpectedly discovered that a combination of polychlorophenoxyphenol, a silver-containing biocide, and an organopolysiloxane, when added to UHMWPE, renders the UHMWPE resistant to both soft and hard fouling. The addition of silicone into the matrix also results in significant improvement in the ease of cleaning the material. The polychlorophenoxyphenol is preferably 2.4.4'-trichloro-2'-hydroxy-diphenylether and the silver-containing biocide is preferably a silver-zinc zeolite.

DETAILED DESCRIPTION OF THE PREFERRED EMBODIMENT(S)

Figure 1:
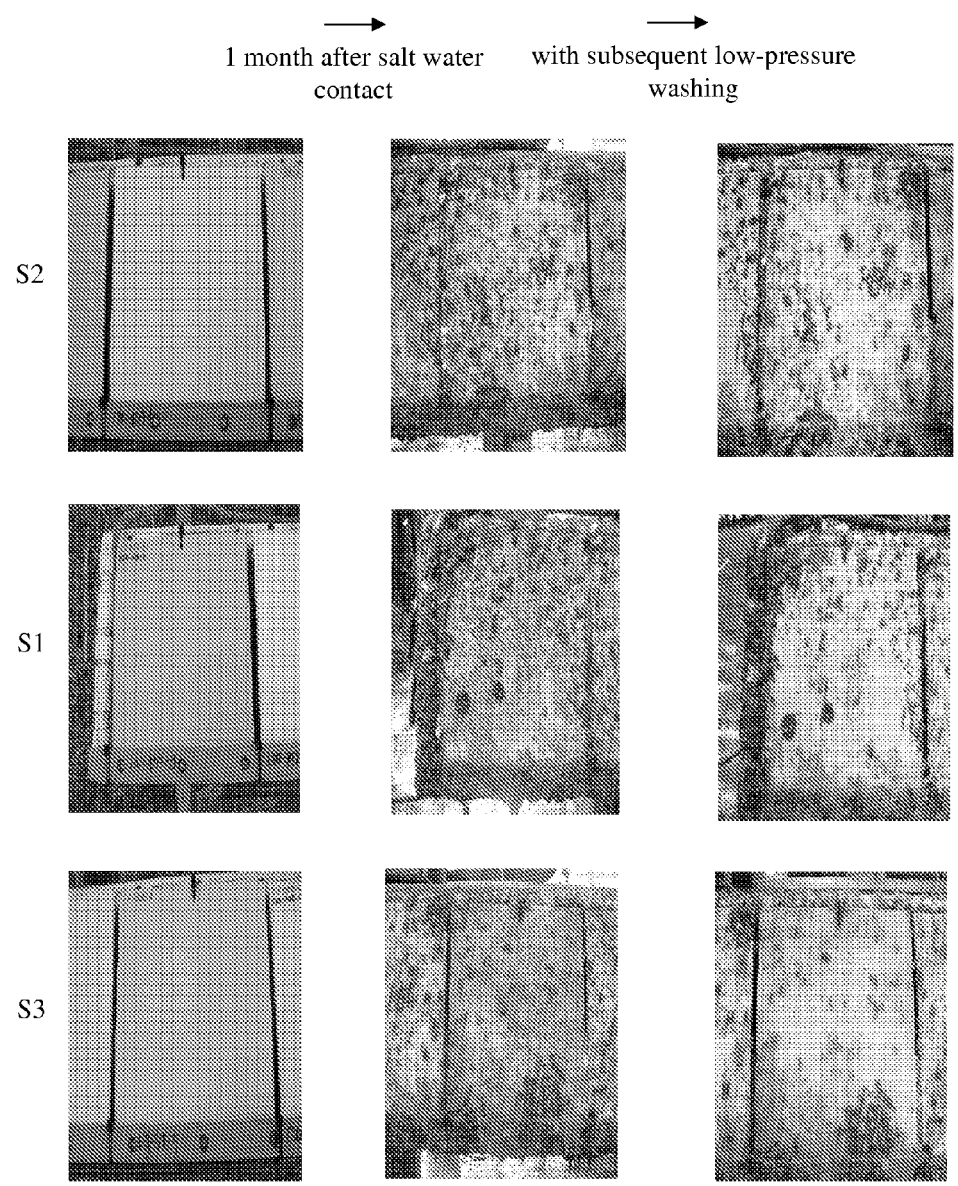
FIG. 1 depicts fouling effects on various UHMWPE samples before salt-water contact, after one-month of salt-water contact, and after subsequent low-pressure wash.

The present invention relates to anti-fouling polyethylene compositions and particularly anti-fouling ultrahigh molecular weight polyethylene (AF-UHMPE) compositions for use in forming and or contacting a surface to reduce accumulation of fouling organisms. As used herein, biofouling occurs when microorganisms find food sources on submerged surfaces. As the bacteria grows, larger organisms are attracted to the submerged surface to feed on the bacteria. Soft fouling, also known as microfouling, is generated when microorganism such as bacteria adheres to a surface and forms a biofilm or slime. Hard fouling, also known as macrofouling, forms as a result of attachment of micro macroorganisms such as barnacles and mussels to the surface.

In one embodiment, the AF-UHMWPE composition includes an ultrahigh molecular weight polyethylene (UHMWPE) preferably having a molecular weight of from $1.0 \times 10^6$ to $1.0 \times 10^7$ Daltons, a polychlorophenoxyphenol, an organopolysiloxane, and a silver-based biocide. Polychlorophenoxyphenol, or alternatively known as PCPP, is a group of organic polyhalogenated compounds. Non-limiting examples of the PCPP include 2.4.4'-trichloro-2'-hydroxydiphenyl-ether and predioxin. The term "biocide" generally refers to a chemical substance capable of killing living organisms, usually in a selective way, including germicides, antibiotics, antibacterials, antivirals, antifungals, antiprotozoals, and antiparasites. The silver-containing biocide used herein is a biocide containing silver, and more preferably silver combined with zinc. In one variation, the AF-UHMWPE further contains carbon black. Without being limited to any particular theory, carbon black is believed to enhance the final anti-fouling compositions' resistance to photodegradation due to sunlight exposure.

In another embodiment, the ultrahigh molecular weight polyethylene (UHWMPE) component of the AF-UHMWPE composition includes the melt-processible wear resistant polyethylene as described in the U.S. Pat. Nos. 6,790,923 and 7,456,242 to Smith et al., the entire contents thereof are incorporated herein by reference. In certain other instances, the UHWMPE component of the AF-UHMWPE composition can be entirely of the melt-processible wear resistance polyethylene as described in the U.S. Pat. Nos. 6,790,923 and 7,456,242.

The ultrahigh molecular weight polyethylene forms a dominant portion of the AF-UHMWPE composition and can be provided at any suitable weight percentage. In one variation, the ultrahigh molecular weight polyethylene is preferably provided at an amount of from 86.5 to 99.5, 88.5 to 98.5, 90.5 to 97.5, or 92.5 to 96.5 by weight of the total weight of the AF-UHMWPE composition.

Conventional polyethylene polymers with which many are familiar, i.e. low and high density polyethylene, are waxy solids not known for exceptional strength properties. Also, due to their relative softness, while generally lubricious, they are easily abraded. Ultra high molecular weight polyethylene, "UHMWPE", on the other hand, is an exceptionally strong and durable polymer totally unlike its poorer relatives.

As used herein and unless otherwise indicated, the term "polymer" includes homopolymers, terpolymers, and copolymers; and the term "monomer unit" indicates a unit of a polymer.

In certain embodiment, the UHMWPE used in the invention is conventional UHMWPE which is available as a resin powder from numerous sources, i.e. from TICONA. The molecular weight is generally from $1.5 \times 10^6$ to $1.0 \times 10^7$ Daltons, and the crystalline melt point is generally around 130° C. to 135° C. This value is not critical, and does not vary a significant amount with varying molecular weight. The crystalline melt temperature can be measured by conventional techniques such as Differential Scanning calorimetry (DSC), and is generally supplied by the manufacturer.

UHMWPE can be prepared by special polymerization processes in which the polyethylene chains acquire an exceptionally high molecular weight, typically having number average molecular weights of from $1.0 \times 10^6$ to $1.0 \times 10^7$ Daltons, supplied as a resin powder. UHMWPE also includes those polymers defined in ASTM D4020-05; D6712-01; and ISO 11542-2. While generally homopolymeric in nature, UHMWPE also includes copolymers having limited amounts of other copolymerizable comonomers. In the case of copolymer UHMWPE, the aforementioned ASTM and ISO requirements should be met. It is their very long polymer chains which make these polymers unique. Comonomers are generally alkenes such as propylene, butylene, 1-hexene, and 1-octene, when these are present.

While ordinary polyethylene can be melt extruded, attempts to melt extrude UHMWPE have been largely unsuccessful, despite much research in this area, and virtually all UHMWPE products are produced by compression molding or ram extrusion, as indicated by U.S. Pat. No. 5,286,576, incorporated herein by reference, which indicates that processing methods applicable to conventional thermoplastics, such as continuous extrusion, calendaring, and injection molding, are generally inapplicable to UHMWPE. Ram extrusion is a unique process which is considerably different from melt extrusion. Ram extrusion may be illustrated with reference to U.S. Pat. Nos. 3,883,631; 3,887,319; and 4,145,175, all incorporated herein by reference. Despite the fact that the ram extrusion technology disclosed in these references is more than 25 years old, there has been only incremental change in ram extrusion processes since that time.

The silver-containing biocide and the polychlorophenoxyphenol collectively reduce, or prevent, the growth of algae, fungus, bacteria, or microbes. The silver-containing biocide and the polychlorophenoxyphenol can be added to the AF-UHMWPE composition as being mixed or as being extruded. One example of the polychlorophenoxyphenol that can be used is the Ciba® IRGAGUARD® B 1000. One example of the silver-containing zeolite that can be used is the Ciba® IRGAGUARD® B 5000 ($M_{2/n}O.Al_2O_3.xSiO_2.yH_2O$). The silver-containing biocide used herein is preferably a biocide containing both silver and zinc.

The silver-containing biocide can be used in an amount of 0.1 percent to 5 percent by weight, 0.5 percent to 4.5 percent by weight, or 1.0 percent to 4.0 percent by weight, of the total weight of the AF-UHMWPE composition. The polychlorophenoxyphenol can be used in an amount of 0.1 to 4 percent by weight, 0.4 percent to 3 percent by weight, or 0.8 percent to 2 percent by weight, of the total weight of the AF-UHMWPE composition.

The metal-containing biocide and the polychlorophenoxy phenol, alone or in combination, can be provided as a concentrate. For example, the concentrate may be 10% silver-zinc zeolite and 10% polychlorophenoxyphenol, and 80% carrier thermoplastic such as UHMWPE, by weight.

The silver-containing biocide and the polychlorophenoxyphenol can be fed to the molding operation, alone or in combination, in solid or powder form, or they can be added as a liquid, when appropriate. The additives may be in the form of powder or pellet, and can be added in a similar manner.

The silver-containing biocide is preferably a silverzinc zeolite. The silver-containing biocide has certain benefits that make the anti-fouling polyethylene compositions particularly useful for underwater applications. For instance, the silver-containing biocide does not readily leach out of the application surface and is relatively resistant to heat, radiation, and chemical attack. When supported on a substrate, for instance, a zeolite substrate, the silver-containing biocide has a more extended half-life and better anti-fouling activities.

The silver-containing biocide can take several forms. Silver may be deposited on a support such as a pulverulent silica, alumina, aluminum silicate, titanium dioxide, or other metal oxide or mixed metal oxide, on any variety of clay materials, including layered clay materials (phylosilicates), on zeolites, polymer beads, or any other convenient support. The silver, present in the form of native metal or a silver compound, may also be encapsulated, for instance in polymer, glass, or ceramic micro-balloons. Silver may be deposited by conventional means, for example as a soluble silver salt followed by calcining, or by reduction from solution using a reductant such as Tollens reagent ("silvering"). The silver also may be in the form of particles of silver, preferably in particle sizes less than 10 μm, more preferably less than 1 μm, i.e. in the nanosize range. The shape of the silver particles is not critical, and may be spherical, irregular, columnar or rod-like, etc. The silver particles may be prepared by conventional techniques, for example by atomization from the melt, or precipitation in solution. Silver biocides are available from numerous commercial sources in numerous forms suitable for use in the invention. Examples include Alphasan by Milliken Co. (a silver zeolite) and Irgagard® by Ciba®. The silver biocide is preferably used in an amount which will supply from 0.1 to 5 weight percent of biocide, calculated as metallic silver, and based on the total weight of the UHMWPE product.

As used herein, the organopolysiloxane is a polymer based on $R_3SiO$ ("M"), $R_2SiO$ ("D"), $RSiO_{3/2}$ ("T") and $SiO_{4/2}$ ("Q") units, where R is an alkyl, alkenyl, cycloalkyl, cycloalkenyl, aryl, alkaryl, or aralkyl group, optionally substituted with functional groups selected from the halogens, preferably F and Cl, more preferably Cl, cyano, amino, or other conventional organopolysiloxane substituents. The substituent must be capable of surviving the consolidation of the UHMWPE. Organopolysiloxanes containing quaternary ammonium groups or quaternary phosphonium groups are also suitable, as these groups may provide additional biocidal action. The organopolysiloxane may also contain silicon-bonded hydroxyl or alkoxyl groups, or aminoalkyl groups.

Preferred organopolysiloxanes are composed mainly of M units and D units, i.e. are substantially linear silicone oils, preferably with viscosities ranging from 500 CST (centistokes) to 50,000 CST, 1,000 CST to 10,000 CST, or 3,000 CST to 7,000 CST. In certain instances, the organopolysiloxane used has a viscosity of about 5,000 CST. Organopolysiloxanes which are lightly branched, i.e. containing up to about 10 mol percent, preferably not more than 5 mol percent of T or Q units, are also useful. Resinous organopolysiloxanes, for example those containing M and Q units (MQ resins), M and T units (MT) resins, T units (T resins), or combinations of any of these, such as MDQT resins, are also useful. It may be necessary to also employ an essentially linear or lightly branched organopolysiloxane if silicone resins are employed.

The R groups of the organopolysiloxane are preferably alkyl groups such as methyl, ethyl, n-propyl, n-butyl, and higher $C_{5-18}$ alkyl groups, including branched alkyls, or readily available aryl groups such as phenyl or naphthyl. Halogenated alkyl and aryl groups are also preferred, including in particular, trifluoromethyl, hexafluoropropyl, and heptafluoropropyl groups. For ready availability and economy, methyl groups are preferred. Trifluoromethyl groups are also preferred. The R groups may be the same or different.

The organopolysiloxane may contain Si—H units. These groups may be expected to react with vestigial unsaturated groups in the UHMWPE, and thus these Si—H groups may no longer be in the product once it is consolidated. In a similar vein, organopolysiloxanes bearing alkenyl groups such as vinyl, allyl, ω-hexenyl, and other unsaturated groups may be at least initially present.

Functional groups such as nitrogen-containing functional groups, e.g. aminoalkyl, morpholinyl-alkyl, and the like, may be present. Also suitable, as mentioned previously, are quaternary nitrogen-containing organopolysiloxanes. These latter may be prepared by methods known to those skilled in the art, for example as disclosed in U.S. published application 2007/0212326 A1, which is incorporated herein by reference, and are available from numerous commercial sources.

The organopolysiloxanes may also contain hydroxyalkyl and alkoxy groups, preferably $C_{1-4}$ lower alkoxy groups, although these are not preferred. Most preferred organopolysiloxanes include trimethylsilyl-terminated, dimethylsilanol-terminated, vinyldimethyl-terminated, and tris(trifluoromethyl)-terminated organopolysiloxanes containing repeating dimethylsiloxy, methylphenylsiloxy, diphenylsiloxy, methyltrifluoromethylsiloxy, bis(trifluoromethyl)siloxy, bis(perfluoroalkyl)siloxy, methylperfluoroalkylsiloxy, bis(perfluoropropyl)siloxy and methylperfluoropropyl siloxy groups. Preferred repeating groups are dimethylsiloxy and perfluoroalkyl-containing siloxy groups, most preferably dimethylsiloxy groups.

The organopolysiloxane can be provided at any suitable weight percentage. In one variation, the organopolysiloxane is provided at an amount of 0.5 to 10 percent, 0.6 to 9 percent, 0.7 to 10 percent, or preferably 1 to 5 percent by weight of the total weight of the AF-UHMWPE composition.

Since the organopolysiloxanes are typically oils, waxes, or gums, depending on their molecular weight, the mode of incorporation may differ. For waxes and gums, for example, it may be desired to produce a "master batch" or intermediate batch by incorporation of the silicone into powdery UHMWPE in a "cutting" type mixer, i.e. a Henschel mixer or continuous annular mixer. Other ingredients such as the biocides can be added at this point as well.

For liquid silicone resins, which are preferred, mixing can take place with standard mixing equipment. The amount of organopolysiloxane added relative to the amount of UHMWPE is preferably such that a dry-appearing or powdery mixture is obtained. If the amount of organopolysiloxane is higher than desired in the product, the "master batch" can be "let down" by addition of further UHMWPE in conventional mixing equipment standard in the art. The other ingredients can also be admixed during mixing of the organopolysiloxane and UHMWPE powder, or can be mixed in later. In continuous processes such as ram extrusion, for example, all the ingredients, even the organopolysiloxane, may be mixed together in the feed hopper or a feed chute. These, for example, may be equipped with mixing blades, augers, or the like. Liquid organopolysiloxane may also be directed into UHMWPE powder, optionally containing the additional ingredients, in the form of a fine mist or spray. The mixing techniques described herein are all well known to those skilled in the art of polymer processing, and are not overly critical, as considerable homogenization of ingredients, particularly the silicone, will occur during the elevated temperature consolidation process. Nevertheless, as uniform a composition of the unconsolidated ingredients as possible is desired.

It has been surprisingly and unexpectedly discovered that all three of the ingredients: the silver-containing biocide, the polychlorophenoxyphenol, and organopolysiloxane, are necessary to provide adequate product properties. If any one of these three ingredients is missing, the product is unacceptable with regard to anti-fouling characteristics.

The AF-UHMWPE products are most useful in aquatic, in particular marine (salt or brackish water) applications. Numerous end products and uses are possible. For example, the anti-fouling UHMWPE ("AF-UHMWPE") product may be used to fabricate seachests for ships. Fabrication may take place by assembly of a plurality of parts into the seachest, or the seachest can be molded directly in one operation. It may be desired to produce only parts of a seachest from the AF-UHMWPE product, with the remaining parts being fabricated from ordinary UHMWPE or from other polymers, fiberglass, metals, etc.

The AF-UHMWPE may be ram-extruded in the form of a "zig-zag" or "W" shape of relatively large width, e.g. 60 cm to 1.2 m, to be used as the vertical sides of a seawall, or as a protective cover for steel seawall material. In the latter case, the extrusion will have a net shape which is compatible with fitting close to the standard steel seawall vertical pieces. The AF-UHMWPE may be adhesively bonded to the steel seawall or secured by conventional fasteners such as screws or rivets.

The AF-UHMWPE may also be applied to structures, particularly metal structures, as a relatively thin layer, for example one of 1 mm to 5 mm in thickness. Such thin layers can be prepared by the method disclosed in U.S. published applications 2008/0020182, 2008/0018022, 2008/0018011, and 2008/0018026 cited earlier, or may be prepared by shaving larger thickness material, for example by using a rotary knife. The advantage of the method used in the aforementioned patents is that long lengths may be provided, whereas in shaving from batch consolidated material, the sheet size is limited to the width and length of the mold.

The sheet materials thus produced may be applied to the bottoms of ships, preferably, ocean-going ships, by adhesive bonding or a combination of adhesive bonding and mechanical fasteners. For adhesive bonding, it is preferred that the AF-UHMWPE sheet product be surface treated on the surface to be bonded to enhance adhesion. Standard methods may be used, for example the use of chemical primers and plasma or corona treatment. Preferably, the sheets are textured on one side by hot roll calendaring to introduce a texture to the surface. The texture may consist of raised islands, grooves, fabric-like patterns, etc., with the aim of increasing the surface area for adhesive bonding. These techniques may also be used with primers, and/or plasma or corona treatment to enhance bondability. A particular advantage of hot roll calendaring is that the outer surface of the sheet, i.e. the side of the sheet which is to contact the marine environment, may be smoothed at the same time, for example to produce a "mirror" finish. As is known, ram extruded UHMWPE contains grooves and shot marks to some degree, although the surface is still relatively smooth. For anti-fouling characteristics, it is understood in general, the smoother the surface, the less biological growth.

The AF-UHMWPE products may also be used to cover wooden and steel dock poles and piles. For this use, the AF-UHMWPE is preferably extruded as a hollow cylinder (tube) of an inside dimension that is acceptable for fitting over the dock pole or pile. In the past, polyvinylchloride pipe has occasionally been used for such applications. However, PVC weathers poorly, is relatively brittle and thus subject to cracking when hit by a ship or barge, and does not prevent biological growth.

The AF-UHMWPE may also be used to line holding tanks, for example those used to hold process water for chemical plants, or used as settling tanks or the like. Lining of sewage treatment facilities is also a possibility, as well as the lining of distribution networks and ducts in HVAC applications, or in particular, as drip pans in air conditioning units where microbial growth is a particular problem (including Legionnaires disease).

A particularly useful property of the AF-UHMWPE products is that they can be washed, e.g. power-washed, to remove biological growth which has accumulated, without significantly affecting future performance. Performance after the first wash, in terms of anti-fouling behavior, is expected to be approximately constant or just slightly declining over time (and future washes). Other products which have been used in the past do not have these desirable properties. Metals, for example, even stainless steel, are generally pitted by corrosion during exposure. Removal of biological growth by power washing is not as good as with AF-UHMWPE, and because the metal surface is not only not as clean as before but is also rougher due to pitting, the time for biological growth to accumulate to the point where a further power washing is required gets less and less as time goes on. In contrast, the surface of UHMWPE is not corroded by ordinary marine environments, and thus does not become rough or pitted. Power washing is effective to remove much more biological growth than when metals are used.

Fiberglass has also been used in some applications. However, the polymer matrix of most fiberglass products (unsaturated polyester, polyurethane) is subject to slow hydrolysis. Moreover, if there is no polymer layer between the reinforcing fibers and exterior, fibers can be quite close to the surface. These substrates, when power washed after exposure, result in roughening of the surface, even penetrating at times into the interior when fibers are exposed. Fiberglass substrates also are not cleaned effectively by power washing. Hence their performance in terms of anti-fouling rapidly decreases over time.

The subject invention AF-UHMWPE products are substantially inert with respect to corrosion and hydrolysis; are more completely cleaned by power washing than other materials; and exhibit less growth of biological organisms, both initially and over time.

The AF-UHMWPE composition optionally includes a pigment or dye. The pigment or dye may impart a desired color to the coating composition and may be added for aesthetic purposes. Pigments and dyes may be powders, flakes, metal flakes, organic or organo-metallic molecules, and the like. Examples of suitable pigments and dyes include iron flakes, iron oxide, such as red, yellow, and black iron oxides, other metal oxides, and carbon black. These solids not only impart color to the composition to allow the user to determine coverage of the structure and to render the film coating relatively impervious to UV light, but also provide chemical resistance to the film coating.

The AF-UHMWPE composition optionally includes one or more additives, such as antioxidants. Polymers with styrene and diene monomer units are unsaturated and are susceptible to attack by oxygen. An antioxidant may be added to the anti-fouling polyethylene composition to prevent the oxidation of the polymers in the polymeric component. The antioxidant may be added in any suitable amount as desired or needed. One suitable type of antioxidant includes a substituted phenolic compound. Commercial antioxidants of this type include Irganox® 1010 and 565 (Ciba-Geigy Co., Ardsley, N.Y.), Ethanox® 330 (Ethyl Corp., Baton Rouge, La.), and BHT (butylated hydroxytoluene, available from a variety of sources).

The AF-UHMWPE composition optionally includes an ultraviolet (UV) absorber or blocker. This may be particularly useful in compositions that are subject to exposure to sunlight or other sources of ultraviolet light. Examples of suitable UV absorbers or blockers include substituted benzotriazoles, hindered amines, benzophenones, carbon black and monobenzoates.

The AF-UHMWPE composition optionally includes ozone blockers particularly useful for compositions subject to air or ozone exposures. Examples of ozone blockers include dibutyl thiourea, nickel dibutyl-dithiocarbomate (DuPont, Wilmington, Del.), Ozone Protector 80 (Reichhold Chemicals, Durham, N.C.) and the like.

The anti-fouling optionally includes a filler. Examples of fillers are talc, aluminium oxide, aluminium silicate, barytes, mica, glass fibres, glass beads and silicon dioxide.

Having generally described this invention, a further understanding can be obtained by reference to certain specific examples which are provided herein for purposes of illustration only and are not intended to be limiting unless otherwise specified.

EXAMPLE

Example 1

The AF-UHMWPE samples used in the following Examples have industrially acceptable thermal expansion property of $1.5 \times 10^{-5}$ to $1.7 \times 10^{-5}$ (unit being reciprocal degrees centigrade or $°C.^{-1}$) in the temperature range of 0° C. to 30° C. as compared to the value of $1.1 \times 10^{-5}$ (unit being reciprocal degrees centigrade or $°C.^{-1}$) for standard thermal expansion of steel; have industrially acceptable properties in tensile strength and yield strength at the temperature range of 0° C. to 30° C.; have izod impact performance values significantly higher than the HDPE controls at temperatures of from −200° C. to 20° C.; and have industrially acceptable impact force value at the temperature range of from 0° C. to 30° C.

In a trial experiment, UHMWPE samples 1-19 containing various additives are prepared to have ingredients as listed in Table 1-1. The listed components are admixed in a high intensity mixer for 60 seconds. The mixture is processed in a compression molding die under a pressure of 700 psi at a temperature of 400° F. for 45 minutes. The molded part is cooled to ambient room temperature under a pressure of 700 psi for 35 minutes. The cooled part is then removed from the die.

TABLE 1-1

| Samples | Material |
|---------|----------|
| S1 | Copper Additive—1% |
| S2 | 1% Pine Oil |
| S3 | 100% UHMW-PE |
| S4 | Copper Sulfate 1% |
| S5 | 1% Alphasan RC2000 |
| S6 | 2% Capsicum & 2% Pine Oil |
| S7 | 2% Capsicum |
| S8 | 1% Alphasan CW-12 |
| S9 | 1% Irgagard 1000 |
| S10 | Control |
| S11 | 1% Irgagard 1000 |
| S12 | 5% Ciba 1000 |
| S13 | 5% Zinc PYRION Pyr |
| S14 | 3% Silicone (use Quicksilver) |
| S15 | 3% Zinc PYRION/3% Irgagard5000 |
| S16 | 3% Irgagard 1000/3% Silicone |
| S17 | 5% Ciba 5000 |
| S18 | 100% UHMW PE |
| S19 | 5% Lanxess |

The samples are then completely submerged in open, salt water for one month and subsequently low-pressure cleaned to see the effect of these samples in reducing adhesion of various soft and hard fouling organisms. FIG. 1 illustrates images taken from several of the samples, S2, S1, and S3, before salt-water contact, after one month of salt-water contact, and after subsequent low pressure power wash. Fouling organisms on the samples as listed in Table 1-1 are identified and counted with corresponding results tabulated in Table 1-2.

TABLE 1-2

| | | BARNACLES | | MOLLUSCS | | ANNELIDS | | HYDROIDS | | BRYOZOA | | | | ALGAE | |
| | | | | | | | | | | EN-CRUSTRING | | FILA-MENTOUS | | SCUM & | |
| Samples | Material | Number | Size | Rating | Size | Number | Size | Rating | % | Rating | % | Rating | Size | Silt | |
| S1 | Copper Additive - 1% | ~30 | 3-9 | | | ~12 | 3-12 | 8 | 3-4 | 9 | 1-3 | 9 | 3-5 | 7 | |
| S2 | 1% Pine Oil | ~40 | 2-8 | | | ~10 | 3-20 | 7 | 5 | 10 | | 9 | 5-8 | 6 | |
| S3 | 100% UHMW-PE | ~25 | 4-9 | | | ~10 | 3-20 | 9 | 1-2 | 10 | | 10 | | 8 | |
| S4 | Copper Sulfate 1% | ~50 | 2-9 | | | ~8 | 2-5 | 8 | 3-4 | 9 | 1-3 | 9 | 3-5 | 6 | |
| S5 | 1% Alphasan RC2000 | ~30 | 2-9 | | | ~5 | 2-5 | 9 | 1-3 | 10 | | 9 | 3-5 | 7 | |
| S6 | 2% Capsicum & 2% Pine Oil | 60+ | 3-9 | | | ~15 | 3-20 | 7 | 5 | 9 | 1-3 | 9 | 3-5 | 6 | |
| S7 | 2% Capsicum | 60+ | 2-9 | | | ~18 | 2-25 | 7 | 5 | 10 | | 9 | 5-8 | 6 | |
| S8 | 1% Alphasan CW-12 | ~30 | 2-9 | | | 1 | 10 | 9 | 1-2 | 10 | | 10 | | 8 | |
| S9 | 1% Irgagard 1000 | ~18 | 1-2 | | | 2 | 1-2 | 9 | 1-2 | 10 | | 10 | | 9 | |
| S10 | Control | ~30 | 1-2 | | | ~10 | 1-3 | 8 | 2-3 | 9 | 1-2 | 7 | 5-8 | 6 | |
| S11 | 1% Irgagard 1000 | ~30 | 1-2 | | | ~10 | 1-3 | 8 | 2-3 | 9 | 1-2 | 10 | | 7 | |
| S12 | 5% Ciba 1000 | 50+ | 1-8 | Trs | 5-8 | 4 | 1-2 | 9 | 10 | Tr | 1 | Tr | 2 | 6 | |
| S13 | 5% Zinc PYRION Pyr | ~20 | S-4 | Trs | 3-6 | ~30 | 1-3 | 5 | 50 | Tr | 1 | Tr | 1 | 6 | |
| S14 | 3% Silicone (use Quicksilver) | ~20 | S-2 | Trs | 1-2 | 70+ | 1-8 | Trs | 8 | Trs | 2 | Tr | 1 | 8 | |
| S15 | 3% Zinc PYRION/3% Irgagard5000 | ~25 | S-3 | | | 30+ | 1-10 | 4 | 60 | Trs | 2 | | | 4 | |

TABLE 1-2-continued

| Samples | Material | BARNACLES Number | Size | MOLLUSCS Rating | Size | ANNELIDS Number | Size | HYDROIDS Rating | % | BRYOZOA EN-CRUSTRING Rating | % | BRYOZOA FILA-MENTOUS Rating | Size | ALGAE SCUM & Silt |
|---|---|---|---|---|---|---|---|---|---|---|---|---|---|---|
| S16 | 3% Irgagard 1000/3% Silicone | ~30 | S-4 | Trs | 2-6 | 30+ | 1-8 | 8 | 20 | Tr | 1 | Tr | 1 | 4 |
| S17 | 5% Ciba 5000 | ~10 | S-2 | Tr | 8 | 40+ | 1-8 | 3 | 70 | | | | | 4 |
| S18 | 100% UHMW PE | 100+ | S-1 | | | 30+ | 1-3 | 4 | 60 | | | Tr | 1 | 6 |
| S19 | 5% Lanxess | 50+ | S-3 | | | | | 10− | 6 | | | | | 10− |

Consistent with the images shown in FIG. 1, results in Table 1-2 demonstrate that sample S1 has 25% less in total number of barnacles than sample S2; sample S3 has 37.5% less amount of barnacles than sample S2. As shown in Table 1-2, "Tr" represents "trace amount;" the "+" sign represents "more or greater;" the "−" sign represents "less or fewer;" the sign "~" represents "about;" and all blanks indicate no detectable measurements are available.

Example 2

Figure 2A:
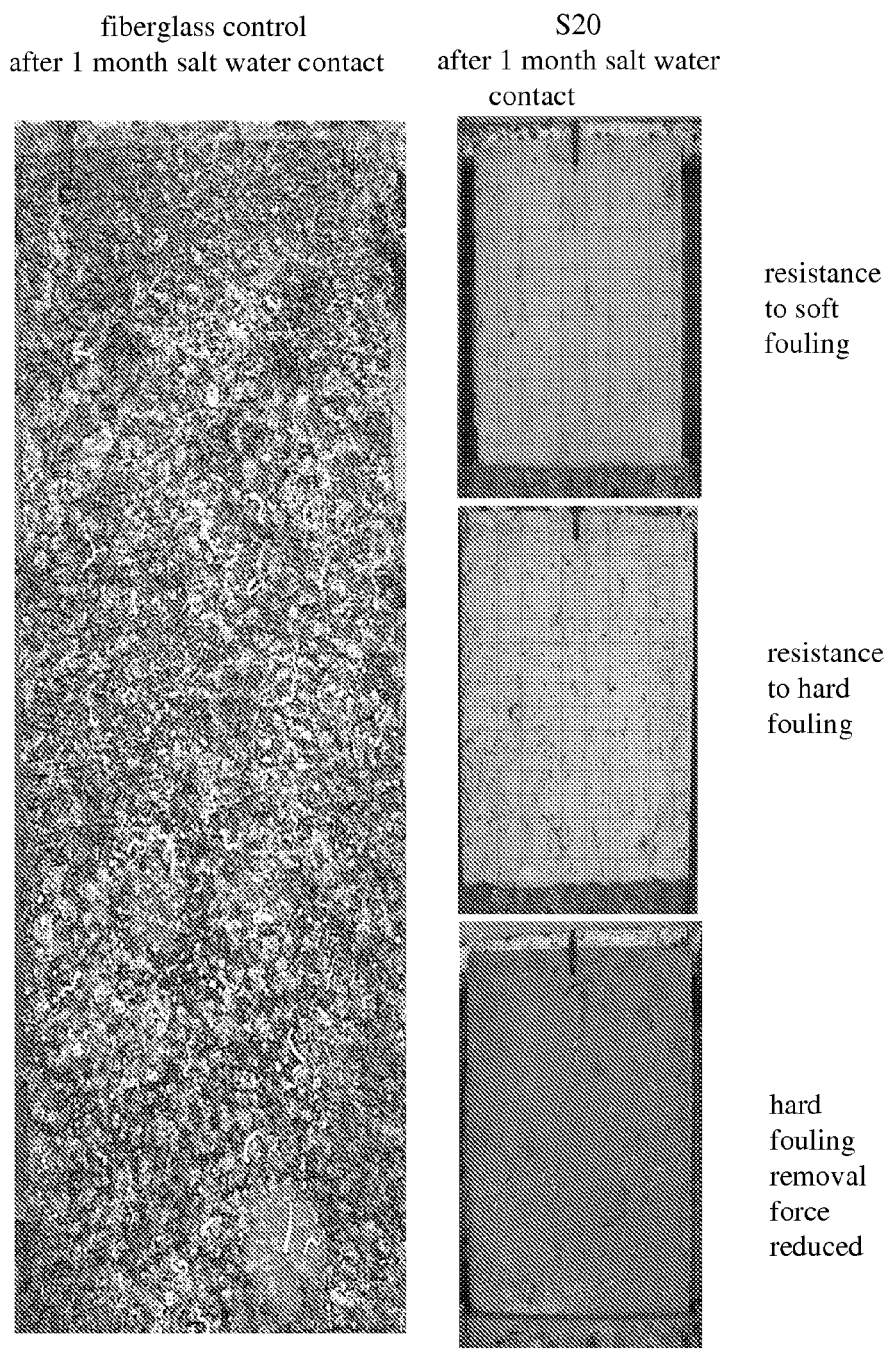
FIG. 2a depicts anti-fouling effects elicited by various UHMWPE samples comparative to conventional fiberglass or steel materials.

For this experiment, sample are prepared according to Example 1 and tested for extent of fouling after one month of salt-water contact along with control sheets made of fiberglass and steel. Consistent with the images depicted in FIG. 2a, results of Table 2-1 demonstrate that the UHMWPE sample S20 containing 3.0 weight percent of Irgagard 5000, 3.0 weight percent of silicone, 1.0 weight percent of Irgagard 1000, effectuates the most significant reductions in organism attachment comparison to conventional fiberglass or steel materials.

TABLE 2-1

| Fouling Rating | Samples | Material | Barnacles cover | Barnacles count | Oysters/Mussels cover | Oysters/Mussels count | Tubeworms cover | Tubeworms count | Bryozoans Encrusting cover | Bryozoans Stalked cover |
|---|---|---|---|---|---|---|---|---|---|---|
| 90 | S20 | 3% Irgagard 5000 3% Silicone 1% Irgagard 1000 | | 1 | | | | | | <1% |
| 50 | S21 | UHMWPE | | 5 | | | | | 1% | <1% |
| 60 | S22 | 1.5% Irgagard 5000 3% Silicone 0.5% Irgagard 1000 | | | | | | | | <1% |
| 50 | S23 | 1.5% Irgagard 5000 5% Silicone 0.5% Irgagard 1000 | | 3 | | | | | 2% | <1% |
| 35 | Fglass | Fiberglass | | 12 | <1% | | 10% | | | 1% |
| 40 | Steel | Steel | | 5 | <1% | | | | | <1% |
| 99 | Cu = AF | Standard copper based paint | | | | | | | | |

| Fouling Rating | Hydroids cover | Tunicates cover | Sponges cover | Amphipod cover | Algae waterline cover | Algae submerged cover | Biofilm cover | Silt cover |
|---|---|---|---|---|---|---|---|---|
| 90 | 1% | | | | | 5% | 40% | 60% |
| 50 | 1% | | | | | 40% | 50% | 60% |
| 60 | | | | | | 30% | 40% | 70% |
| 50 | <1% | | | | | 30% | 40% | 70% |
| 35 | 1% | | | | | 5% | 20% | 60% |
| 40 | 1% | | | | | 5% | | 80% |
| 99 | | | | | | | 40% | 50% |

Various features of the AF-UHMWPE samples in comparison to control materials made from steel, fiberglass, or copper based paint are tabulated in Table 2-2. These features include effect on soft fouling reduction, effect on hard fouling reduction, ease of cleaning, resistance to chip and abrasion, weight, and potential future ecological effects. All blanks shown in the Table 2-2 indicate no detectable measurements are available.

TABLE 2-2

| Material | Soft-fouling reduction | Hard-fouling reduction | Ease of cleaning | Resistance to chip/abrasion | Weight | Ecological effects |
|---|---|---|---|---|---|---|
| Steel | poor | poor | fair | fair | poor | minimal |
| Fiberglass | poor | poor | poor | good | fair | minimal |
| AF-UHMWPF | good | excellent | excellent | excellent | excellent | minimal |
| Copper-based paint | excellent | excellent | excellent | fair | n/a | high |

Figure 2B:
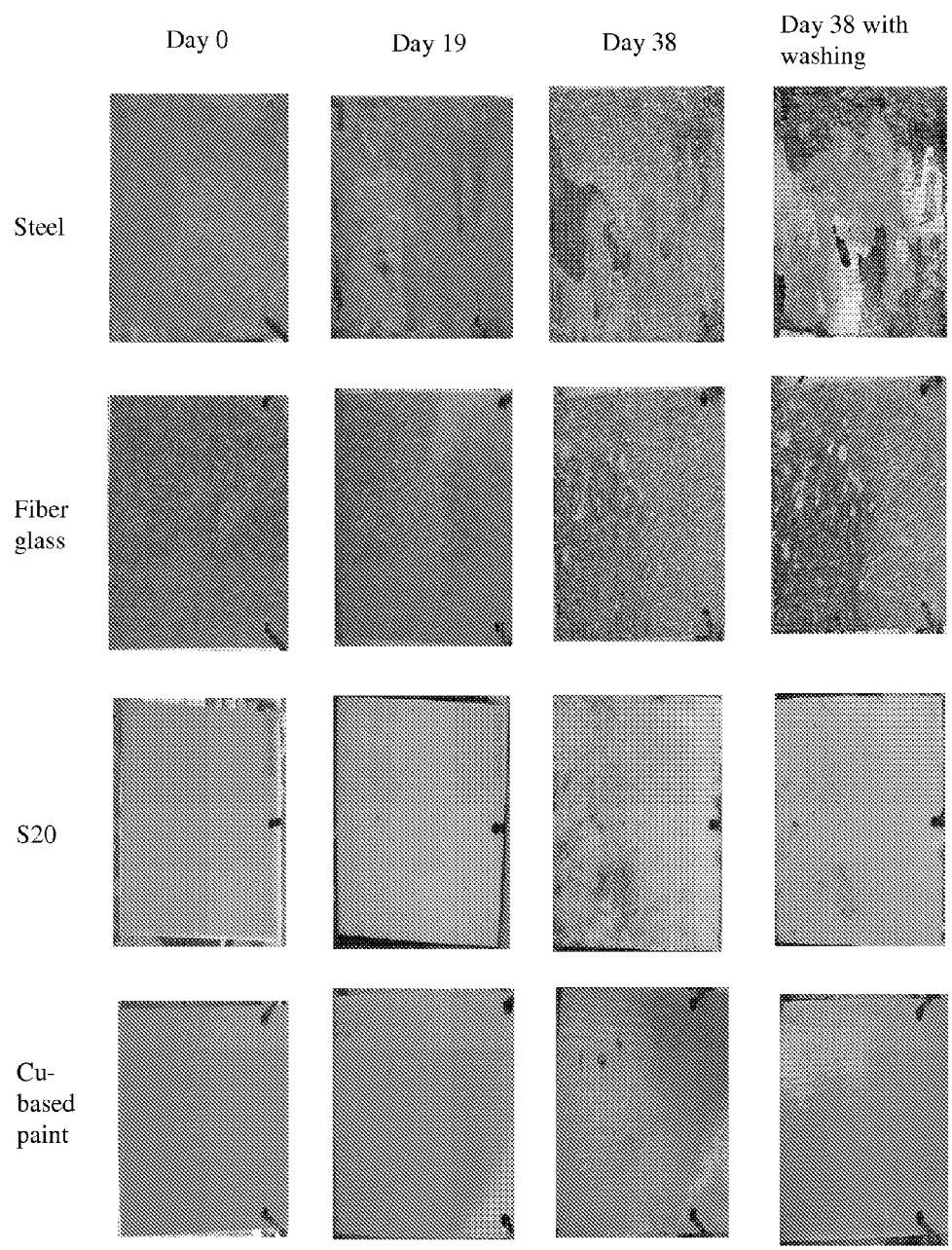
FIG. 2b depicts anti-fouling effects elicited by various UHMWPE samples comparative to conventional steel and fiberglass materials and copper-based AF paint upon contact in salt-water for 19 days, 38 days, and low-pressure wash thereafter

As depicted in FIG. 2b, anti fouling effect of the AF-UHMWPE sample is compared with that of steel sample, fiberglass sample, and copper based AF paint, upon submerged contact in salt-water for 19 days, 38 days, and subsequent wash after 38 days. The AF-UHMWPE sample effects significantly less fouling than the steel or fiberglass counterparts, and elicits an anti fouling effect equivalent to the copper based AF paint.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An anti-fouling ultrahigh molecular weight polyethylene (AF-UHMPE) composition comprising:
    a mixture of an ultrahigh molecular weight polyethylene (UHWMPE) having number average molecular weight of $1.0 \times 10^6$ to $1.0 \times 10^7$ Daltons,
    a polychlorophenoxyphenol,
    an organopolysiloxane, and
    a silver-containing biocide.

2. The anti-fouling ultrahigh molecular weight polyethylene composition of claim 1, wherein the silver-containing biocide is a silver-containing zeolite.

3. The anti-fouling ultrahigh molecular weight polyethylene composition of claim 2, wherein the silver-containing zeolite further includes zinc.

4. The anti-fouling ultrahigh molecular weight polyethylene composition of claim 1, wherein the organosiloxane is a silicone resin.

5. The anti-fouling ultrahigh molecular weight polyethylene composition of claim 1, wherein the polychlorophenoxyphenol is 2.4.4'-trichloro-2'-hydroxy-diphenylether.

6. The anti-fouling ultrahigh molecular weight polyethylene composition of claim 1 further comprising carbon black.

7. The anti-fouling ultrahigh molecular weight polyethylene composition of claim 1, wherein the organopolysiloxane is provided at 0.5 to 10 percent by weight of the total weight of the AF-UHMWPE composition.

8. The anti-fouling ultrahigh molecular weight polyethylene composition of claim 3, wherein the silver-zinc zeolite is provided at 0.1 to 5 percent by weight of the total weight of the AF-UHMWPE composition.

9. An anti-fouling ultrahigh molecular weight polyethylene (AF-UHMWPE) composition comprising:
    a mixture of an ultrahigh molecular weight polyethylene having a number average molecular weight of from $1.0 \times 10^6$ to $1.0 \times 10^7$ Daltons,
    2.4.4'-trichloro-2'-hydroxy-diphenylether,
    a silicone, and
    a silver-containing zeolite.

10. The anti-fouling ultrahigh molecular weight polyethylene composition of claim 9, wherein the silver-containing zeolite further includes zinc.

11. The anti-fouling ultrahigh molecular weight polyethylene composition of claim 9 further comprising carbon black.

12. The anti-fouling ultrahigh molecular weight polyethylene composition of claim 9, wherein the 2.4.4'-trichloro-2'-hydroxy-diphenylether is provided in an amount of from 0.5 to 5 percent by weight of the total weight of the AF-UHMWPE.

13. The anti-fouling ultrahigh molecular weight polyethylene composition of claim 9, wherein the silicone resin is provided at 0.1 to 5 percent by weight of the total weight of the AF-UHMWPE composition.

14. The anti-fouling ultrahigh molecular weight polyethylene composition of claim 9, wherein the silver-containing zeolite is provided in an amount of from 0.1 to 5 percent by weight of the total weight of the AF-UHMWPE composition.

15. The anti-fouling ultrahigh molecular weight polyethylene (AF-UHMWPE) composition of claim 1 in the form of a body part for use in aqueous applications.

16. The anti-fouling ultrahigh molecular weight polyethylene (AF-UHMWPE) composition of claim 15, wherein the body part is a sea-chest.

17. A method of reducing fouling organism accumulation on a surface of a vessel, comprising:
    forming the surface from or contacting the surface with an anti-fouling ultrahigh molecular weight polyethylene (AF-UHMWPE) composition of claim 1.

18. The method of claim 17 wherein the polychlorophenoxy pheno of the AF-UHMWPE composition surface is 2.4.4'-trichloro-2'-hydroxy-diphenylether.

19. The method of claim 17, wherein the silver-containing biocide of the AF-UHMWPE composition is silver-zinc zeolite.

* * * * *